United States Patent
Tran

(10) Patent No.: US 6,269,861 B1
(45) Date of Patent: Aug. 7, 2001

(54) TIRE REMOVAL AND INSTALLATION TOOL

(75) Inventor: Loi V. Tran, 1028 Jackson St., Easton, PA (US) 18042

(73) Assignee: Loi V. Tran, Easton, PA (US)

( * ) Notice: Subject to any disclaimer, the term of this patent is extended or adjusted under 35 U.S.C. 154(b) by 0 days.

(21) Appl. No.: 09/515,451

(22) Filed: Feb. 29, 2000

(51) Int. Cl.$^7$ .................................................. B60C 25/04
(52) U.S. Cl. ............................ 157/1.3; 157/1.1; 157/1.26
(58) Field of Search ........................... 157/1.3, 1.1, 1.26; 81/15.3

(56) References Cited

U.S. PATENT DOCUMENTS

| | | |
|---|---|---|
| 4,090,548 | 5/1978 | Wolf . |
| 4,133,363 | 1/1979 | Gardner . |
| 4,360,052 | 11/1982 | Norris . |
| 4,403,640 | 9/1983 | Schifferly . |
| 4,436,134 | 3/1984 | Gaither . |
| 4,461,335 | 7/1984 | Beemer . |
| 4,527,607 | 7/1985 | Gaither . |
| 4,738,294 | 4/1988 | Fosse . |
| 4,756,354 | 7/1988 | Callas . |
| 4,846,239 | 7/1989 | Heller et al. . |
| 4,890,661 | 1/1990 | Goebel . |
| 4,919,184 | 4/1990 | du Quesne . |
| 4,995,439 | 2/1991 | Burge . |
| 5,009,257 | 4/1991 | Reeves . |
| 5,123,470 | 6/1992 | Tran . |
| 5,143,134 | 9/1992 | Tran . |
| 5,152,330 | 10/1992 | Heise . |
| 5,191,934 | 3/1993 | Wicklund . |
| 5,244,029 | 9/1993 | Schoen et al. . |
| 5,265,661 | 11/1993 | Tran . |
| 5,343,921 | 9/1994 | Kusner . |
| 5,363,897 | 11/1994 | Branch . |
| 5,417,270 | 5/1995 | Brunner . |
| 5,472,034 | 12/1995 | Corghi . |
| 5,495,882 | 3/1996 | Trant . |
| 5,678,621 | 10/1997 | Trant . |
| 5,740,848 | 4/1998 | Goracy . |
| 5,806,578 | 9/1998 | Gonzaga . |
| 5,971,052 | 10/1999 | Kliskey . |
| 5,979,532 | 11/1999 | Wridt . |

Primary Examiner—Timothy V. Eley
Assistant Examiner—Willie Berry, Jr.

(57) ABSTRACT

A tool is provided for assistance in removing and installing tires on wheel rims. The tool has a body with a lateral opening for engaging the flange of a wheel rim, preferably opening into a cavity that is wider than the opening such that the tools pivots between stable positions on a fulcrum at which lips of the lateral opening bear against the flange. A roller is mounted on one end of the tool body to exert a downward pressure on the tire sidewall, and a handle protrudes on an end opposite the cavity and fulcrum from the roller. The roller displaces the tire bead from its seat against the rim when removing or installing the bead of a tire that is already at least partly on the rim, or supports the second bead of a tire whose first bead is axially outside of the rim relative to the wheel rotation axis. Displacing the bead from its seat opens a radial clearance between the bead and the rim, so that the tire can be displaced eccentrically to relieve tension on the bead due to prying on a diametrically opposite side of the tire. The roller has a rotation axis tangential to the rim, and thus is positioned to facilitate eccentric displacement of the tire on the rim, namely by radial displacement in the area of the roller. The tool can have one cavity or a number of cavities among which the user chooses as appropriate to the dimensions of the tire and the amount of leverage to be applied to the roller via the handle.

8 Claims, 4 Drawing Sheets

TIRE REMOVAL AND INSTALLATION TOOL

FIELD OF THE INVENTION

The invention relates to tools for assisting in the installation and removal of vehicle tires to/from wheel rims. In particular, the invention concerns a manually manipulated tool that is structured to engage the wheel rim flange and to depress and hold the sidewall of a tire axially inwardly (relative to the wheel axis) from a position of engagement with the wheel rim flange. By assisting in separating the tire bead from the rim flange, the tool permits displacement of the tire relative to the rim in axial and radial directions, and thereby facilitates tire removal or installation.

BACKGROUND OF THE INVENTION

Various manual and powered tools for installing and removing tires from wheel rims are known. In a manual version such tools generally comprise an elongated pry bar handle, which is gripped by a user, and a flattened tool end for insertion between the tire bead and the wheel rim. The bead of a tire is generally wire reinforced and resists deformation. The bead is usually intended to seal a mounted tire to the wheel rim. For this purpose the bead has a diameter that is somewhat less than the diameter of the wheel rim flange and resides between the spaced flanges of the wheel rim. The bead resists stretching is urged axially against the rim and sealed to the rim, inter alia, by pneumatic pressure in the tire or in an inner tube in the tire.

To remove a tire from a rim, the beads are unsealed or "broken" by moving them axially inwardly to disengage from sealing engagement with the rim. Then the two beads and sidewalls of the tire are passed axially over one of the rim flanges to remove the tire from the rim. Inasmuch as the diameter of the bead is less than that of the rim, this involves forcing the bead over the rim, by stretching the bead and/or deforming the bead into an oval and moving the longer dimension of the oval around the rim.

A working end of a tool is inserted between the tire bead and the rim flange. The user applies pressure to the opposite handle end, using the tool as a lever and the wheel rim as a fulcrum. A short length of the tire bead is lifted axially over the rim flange. This process is repeated in successive stages to increase the length of the bead on the axial outside of the rim flange, often using two or three pry tools around the periphery of the wheel rim to hold a portion of the bead against popping back over the rim flange while more of the bead is pried over the rim flange. After a certain angular span has been passed over the rim flange, prying at a distance from that span (e.g., at a diametrically opposite position) pulls the bead portion that is already outside the rim radially inwardly on the outside, rather than tending to pull that portion back between the rim flanges. It becomes easier to pass the remainder of the bead axially over the rim until the entire tire bead resides outside the rim.

Powered machines are available to serve the same function. The wheel is mounted on a spindle and the bead is broken. A short length of the tire bead is pried over the rim flange. A tool is placed under the lifted bead and engaged with a driving shaft on the spindle, whereupon an end of the tool is passed circumferentially around the periphery of the wheel rim flange, pulling the bead over the rim flange.

To fully remove the tire, the opposite side bead is passed over the same rim flange as the first bead, in a similar manner. For installing a tire on a wheel rim, the foregoing process is carried out in reverse order, manually or using powered means.

The wheel rim has a diameter greater than the diameter of the bead of the tire, for sealing. Additionally, axially inwardly from the rim, the diameter of the wheel is substantially less than the diameter at the flanges. Similarly, the internal diameter of the tire is greater at the tread than at the beads. As a result, the wheel rim flanges permit lateral displacement of a tire on the wheel rim (i.e., radial displacement whereby the tire is rendered eccentric relative to the wheel axis). Moving the bead radially inwardly between the wheel flanges (or outside of them) permits that bead on the opposite side of the wheel to be moved radially outwardly and passed axially over the outside diameter of the rim. This facilitates tire installation and removal.

For example, to remove a conventional automobile tire from a wheel rim, the tire is deflated. The seals between the tire beads and the rim flanges are broken. In this unpressurized state, the tire beads no longer abut against the wheel rim flanges, and can be pressed axially inwardly from the rim flanges, as well as displaced radially in the reduced diameter area axially between the rims. A pry bar is inserted between the tire and the wheel rim and is used to pry a portion of the tire bead axially over the wheel flange (rim), thus drawing a short length of bead over the wheel rim to a position axially outside of the rim. The tire can be shifted laterally relative to the center of the tire rim to provide clearance in the direction of prying while temporarily pulling the bead on the diametrically opposite side of the wheel radially inwardly. This process is continued around the periphery of wheel rim, temporarily shifting the tire laterally (radially) in the direction of prying until the tire bead has been passed over the wheel rim all around the rim circumference.

After the bead of a pneumatic tire is broken, the tire sidewalls are readily displaceable or simply buckle axially inwardly from lack of pressure pushing the sidewalls outwardly and engaging the bead against the rim. However, tires that are more rigid, such as heavy duty tires, tractor tires, low profile automobile tires and so called "run-flat" tires mechanically retain their sidewall shape and the position of the tire bead against the inner surface of the rim flange, even after the tire is deflated (if applicable) and/or after the seal between the tire bead and rim flange has been broken. It can be significantly more difficult to pry the bead of a rigid tire over the rim than for a flexible light duty pneumatic tire.

Conventional powered tire processing machines, e.g., for removal of pneumatic automobile tires, require the user initially to pry a portion of the tire bead over the wheel rim to engage the machine tooling. For rigid tires this task can be virtually impossible for a single person to accomplish. It may require separating the tire bead from the rim flange on one side of the wheel while simultaneously inserting a pry bar between the tire bead and the rim flange on the opposite side of the wheel and prying a portion of the tire bead over the rim. Perhaps recognizing that existing machines are deficient in this regard, equipment manufactures have recently introduced machines which are intended for removal and installation of rigid tires. For example, the Only Coats Model No. 9010E manufactured by Henessey Industries, Inc. of LaVergne Tenn. comprises a series of pneumatically operated swing-in mounted rollers for flexing and holding the sidewalls of rigid tires. These new generation machines may be effective, but they also are expensive.

What is needed is an effective but less-expensive way to remove and install tires, especially relatively rigid tires that require more than a momentary bead-breaking pressure to disengage the tire from the rim. Advantageously, the same tool should assist a manual operation or an automated and machine-powered operation, and should be usable in a wide variety of different operations.

SUMMARY OF THE INVENTION

The present invention provides such a tool for removing and installing tires. The invention is applicable to a wheel of the type having axially spaced rim flanges extending to a radially outward edge. The tire has axially spaced sidewalls, each extending from an outermost tread to a bead at a radial inward edge. The beads have a diameter smaller than the diameter of the rim flanges, such that axially outward pressure (e.g., from pneumatic force or from resilient compression of a filling material) engages the bead against the rim.

The tool includes a tool body having a handle portion and a roller extending in opposite directions on the tool body. The tool body has at least one laterally opening cavity that is shaped to engage the rim flange in a way that permits the tool to be set on the flange at a stable position in which the roller presses the sidewall radially inwardly to displace the bead from the rim adjacent to the roller. In a preferred embodiment, the cavity in the tool body has a lateral opening large enough to receive the rim and permitting the body to be engaged over the rim flange. Preferably, the cavity is enlarged proceeding inwardly from the opening into the cavity. That is, the cavity has a longitudinal dimension that is greater than a longitudinal dimension of the cavity opening. As a result, the tool can be engaged in a stable manner on the rim in a position at which the roller bears against the sidewall and displaces the sidewall axially inwardly from the rim.

BRIEF DESCRIPTION OF THE FIGURES

Other objects, advantages and novel features of the invention will become more apparent from the following detailed description of the invention when considered in conjunction with the accompanying drawings wherein.

DETAILED DESCRIPTION OF PREFERRED EMBODIMENTS

The invention provides a tool to facilitate the installation or removal of a tire from a wheel rim which is manually fixable in a stable manner on the rim. When engaged with the rim the tool depresses and holds the sidewall of a tire at a position spaced axially inward from the rim. As used in this disclosure, terms such as "axial," "radial," etc. refer to the rotation axis of the wheel, unless otherwise stated.

The tool of the invention is useful to separate and space the bead of the tire from the rim flange of a corresponding wheel during mounting and dismounting of the tire and can be placed at particular angular position around the circumference of the rim or readily moved to a different angular position. The tool can be used with conventional pneumatic tires, and is particularly useful when mounting and dismounting substantially rigid tires, such as large tractor/trailer tires, low profile automobile tires, run-flat tires and the like. Tires of that type are characterized by substantial resilient pressure of the bead against the rim. Pneumatic tires exert a similar pressure but the pressure is relieved at least to an extent, when the tire is deflated.

Figure 1:
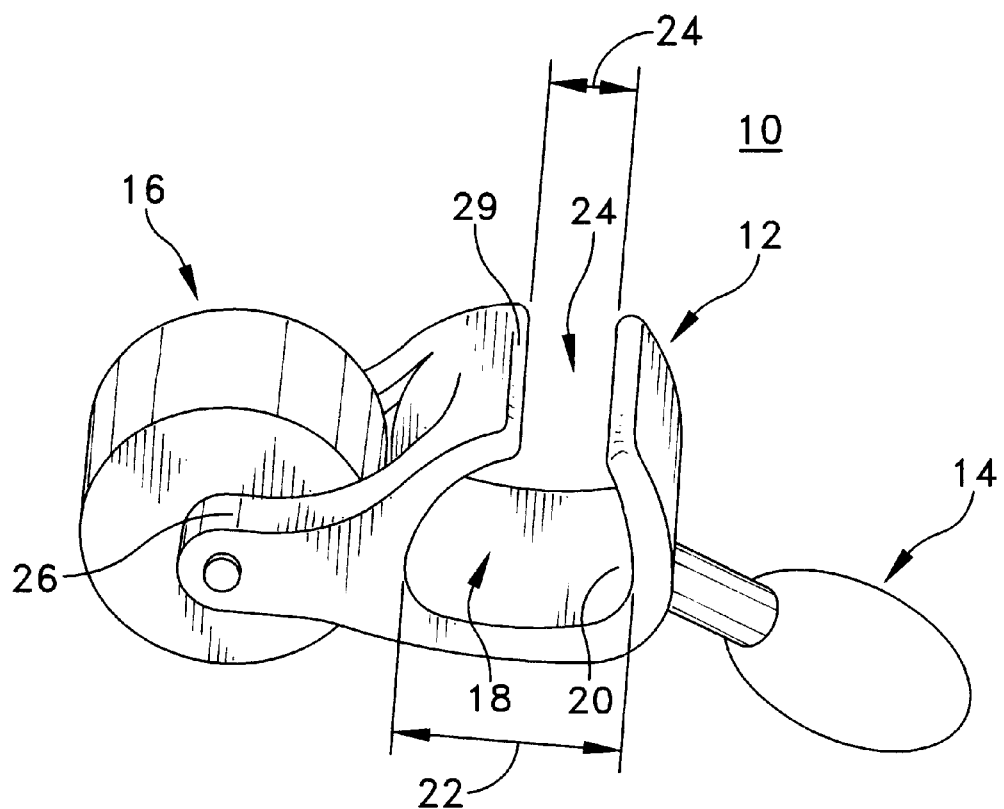
FIG. 1 is a perspective view of a tool for removing and installing a tire according to the invention.

FIG. 1 shows an exemplary embodiment of a tire removal tool 10, in accordance with the invention. The tool of the invention can be used in connection with a manual pry bar for removal and installation of tires, as suggested in FIGS. 2–3a, or the tool can be used in combination with other manual tools or with machinery such as conventional powered devices that assist or automate the removal and mounting of tires. The tool is configured to engage with the rim flange of a wheel to fix the angular position of the tool around a fulcrum at a tangent to the wheel rim. The tool has a contact end that presses against the tire sidewall, thereby detaching and/or spacing the bead from the rim in the local area of the tool.

The same reference numbers are used in the respective drawings to identify the same elements. Referring to FIG. 1, tool 10 includes a tool body 12 that is cast, cut from stock or assembled, and has an integrally formed or separately attached tool handle 14 and a rotatable roller 16, protruding generally in opposite directions on tool body 12. A cavity 18 is provided, extending laterally through elongated tool body 12 and forming a lateral channel having an opening at its surface that is laterally narrower than the corresponding lateral extension within body 12, proceeding inwardly from the surface.

Lateral cavity 18 has an opening 20 that is sufficiently wide to receive a portion of a wheel rim flange. However the clearance between the lips or edges of cavity 18 and the flange, as shown in FIGS. 2a and 3a, is only minimal compared to the relatively substantial clearance between the inner surfaces of cavity 18 proceeding inwardly from the surface. In the embodiment shown, cavity 18 has an arcuate profile defining a rim engaging surface 20 and opening at relatively thin lip-like edges at the surface of body 12. The cavity 18 has a clear longitudinal dimension 22 that is larger than the longitudinal dimension 24 of the opening. The opening is only slightly wider than the rim.

As a result of these structural aspects, the tool body 12 can be readily engaged with the rim by placing body 12 over the rim so that the rim extends into cavity 18. The clearance between the lips or edges of cavity 18 at the surface of body 12, allows the tool body to be moved to a desired location on the circumference. Inasmuch as the rim engaging surface 20 is laterally larger than the space between the lips, the body 12 can pivot over a limited angular span on a fulcrum at the engagement point between the lips and the rim. More particularly, the tool body 12 can pivot until the extreme edge of the rim flange abuts a point on one of the opposite inside walls of cavity 18, whereupon tool body 12 is fixed to the rim and cannot be pivoted or rocked further.

In FIGS. 2a and 3a, the tool has been placed on the rim, and the resilient pressure of the tire bead, which exerts an upward force in FIGS. 2a, 3a, rocks the tool to its extreme stable position, namely to its clockwise limit of rotation in these views, whereupon the edge of the rim flange abuts the inner cavity wall and the tool remains fixed. In this position the tool body (in particular the roller at the end of the tool body in the example shown), holds the tire bead at a downward space from the rim. The user can remove or reposition the tool readily, by exerting further pressure on the tool body against the resilient pressure of the bead (namely counterclockwise in FIGS. 2a, 3a), using a handle that protrudes in the opposite direction from the roller end. This causes the edge of the rim to disengage from the inside wall of cavity 18.

Advantageously, this configuration is embodied in a manner that allows one for of tool to be used with a variety of rim flange designs. Provided the rim is thin enough to be received in cavity 18, the tool can be placed on the rim, and due to the pivoting action described, the tool body 10 will lock securely on the rim flange at the desired position. Although in the embodiment shown, the cavity has an arcuate profile on its inner surfaces, it will be appreciated by those ordinarily skilled in the art, that alternative profiles for a cavity behind relatively closely spaced lips, including but not limited to rectilinear shapes, are equally effective, and may be desirable, depending on the particular rim configuration.

Referring to FIGS. 1, 2, 2a, 3 and 3a, rotatable roller 16 is mounted to the tool body 12 at a predetermined short distance from the body cavity. In this position, roller 16 is placed to engage and depress the sidewall of a mounted tire at a point that is radially outward from the annular position at which the bead seals with the rim flange. The roller displaces the sidewall axially inwardly. The bead is adjacent to this point, namely on the radially innermost edge of the sidewall. Thus depressing the sidewall separates the tire bead from the rim flange of the wheel.

In the embodiment shown, roller 16 is a rotatable cylindrical roller that is mounted between two laterally spaced flanges 26 which extend from the tool body 12. The roller has a rotating axis that is generally parallel to the plane of the tire sidewall and tangential relative to the wheel axis. The roller 16 in this embodiment rotates to accommodate lateral shifting of the tire relative to the wheel, during tire mounting and dismounting. In a less preferred arrangement, the roller could be replaced by a simple contact structure spaced from the surface of the body adjacent to cavity 17, so that the contact structure noses down the tire sidewall in the deployed position shown, but does not rotate. The roller is preferred for reducing friction and easing the mounting and placement of the tool body. It is also contemplated that other friction reducing devices, surfaces and structures, movable or static, may be substituted for the rotatable roller shown in the exemplary embodiment. Alternative devices include, but are not limited to spherical rollers and bearings.

The tool body, and in particular flanges 26, may be lengthened or shortened to adjust the the radial position at which roller 16 contacts the sidewall. The distance between the contact point and the cavity 18 of tool body 12, and the length of the handle, affect the leverage that the tool exerts in pivoting about a fulcrum between the lips of cavity 18, and can be varied to accommodate a variety of tire and rim sizes and also a range of tire sidewall stiffness. The tool body 12 and roller 16 are preferably made from a durable material that can withstand heavy use, such as corrosion resistant steel.

FIGS. 2, 2a, 3, 3a also demonstrate use of the tool. The conventional pneumatic tire for motor vehicles and the like has a bead along each of the two radial inner edges of the tire sidewalls, which engage with axial pressure, due to tire inflation or resilience, against the radially outermost lip of the wheel rim flange on both opposite sides of the wheel. The bead and the rim flange are continuous circles, and the bead is slightly smaller than the rim flange such that the rim flange blocks axial movement of the bead beyond the axially inner surface of the tire flange. In the space between the flanges of the rim, the diameter of the rim is progressively less proceeding axially to the midpoint of the rim. The bead normally has an embedded wire reinforcement that restricts the extent to which the circumference of the bead can be enlarged by tension, but the bead is sufficiently resilient and the radial distance over which the bead contacts the rim flange is sufficiently short, that with sufficient force the bead can be stretched and forced over the rim flange at least over a limited circumferential span adjacent to a prying tool used for this purpose.

Whether by pneumatic inflation or by compression of a resilient tire body material, the normal pressure of the bead against the rim is insufficient to pass the circumferentially smaller tire bead over the larger wheel rim flange, and normally holds the tire in place on the rim. Also, the shorter circumference of the bead relative to the rim is such that if a limited circumferential span of the bead is pried over the rim, that span seeks resiliently to snap back between the axially spaced flanges of the rim. When prying more and more of the circumference of the bead over the rim flange, there is a point at which the radially inward bias of the stretched bead seeks to snap the bead radially inwardly on the axial outside of the corresponding rim flange.

When the bead position is not fixed by attachment to the axial inside of the rim, the bead could be moved in a radial direction (e.g., laterally left and right in FIGS. 2a, 3a). As shown in FIG. 2a, for example, the U-shaped cross section of the rim is such that by depressing the bead axially inwardly from the rim flange, a radial space opens between the bead and the rim. If the bead is moved laterally toward the wheel rotation axis (i.e., radially inwardly), tension on the bead is relieved in a manner that facilitates prying of the bead over the rim on the diametrically opposite side of the wheel.

The ease with which the bead can be passed over the rim flange is affected by the fact that the bead is normally fixed on the axial inside of the rim flange around portions of the rim that are spaced from the point at which the bead is pried. For flexible pneumatic tires, it is usually possible to depress the tire sidewall manually. For relatively incompressible tires such as rigid pneumatic tires or resiliently filled non-pneumatic tires, there is a problem with the manual depression technique. This is particularly true in the case of truck tires, trailer tires, low profile tires, and run-flat tires, namely those that are not easily compressed or deformed or stretched along the bead.

The U-shaped cross-section of the rim provides a smaller rim diameter at an axially inward position between the wheel rim flanges, from the position normally occupied by the bead. This structure permits lateral (radial) shifting of a tire relative to the wheel rim during mounting and dismounting. Such a rim structure for the wheel may be tapered axially and radially (i.e., generally conical on each side) or the wheel may have a centrally disposed circumferential channel of reduced diameter, etc. In any case, by displacing the tire bead from the rim flange, axially inwardly, the bead is disposed at a position where there is clearance with the wheel rim such that the tire can be shifted laterally (radially) on the wheel rim. Displacing the tire eccentrically of the wheel axis in this manner facilitates prying of the diametrically opposite part of the tire bead over the rim flange. The process can then be used for the beginning stages of passing the bead over the rim, or it can be repeated in successive stages about the periphery of the wheel until the entire tire bead has passed over the rim flange.

Figure 2:
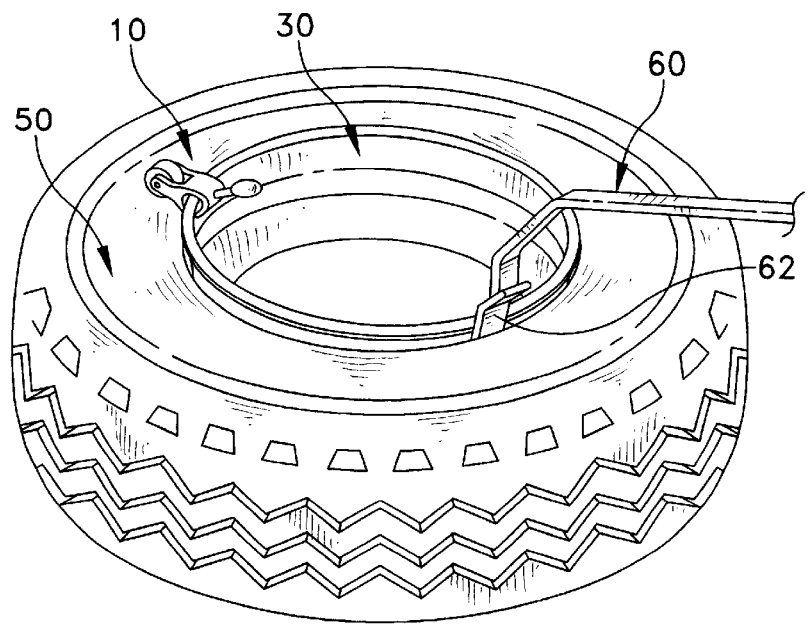
FIG. 2 is a perspective view of the tire removal tool, shown deployed on the rim flange of a wheel having a tire thereon, and including a depiction of a pry bar at a position angularly spaced from the tire removal tool.
Figure 2A:
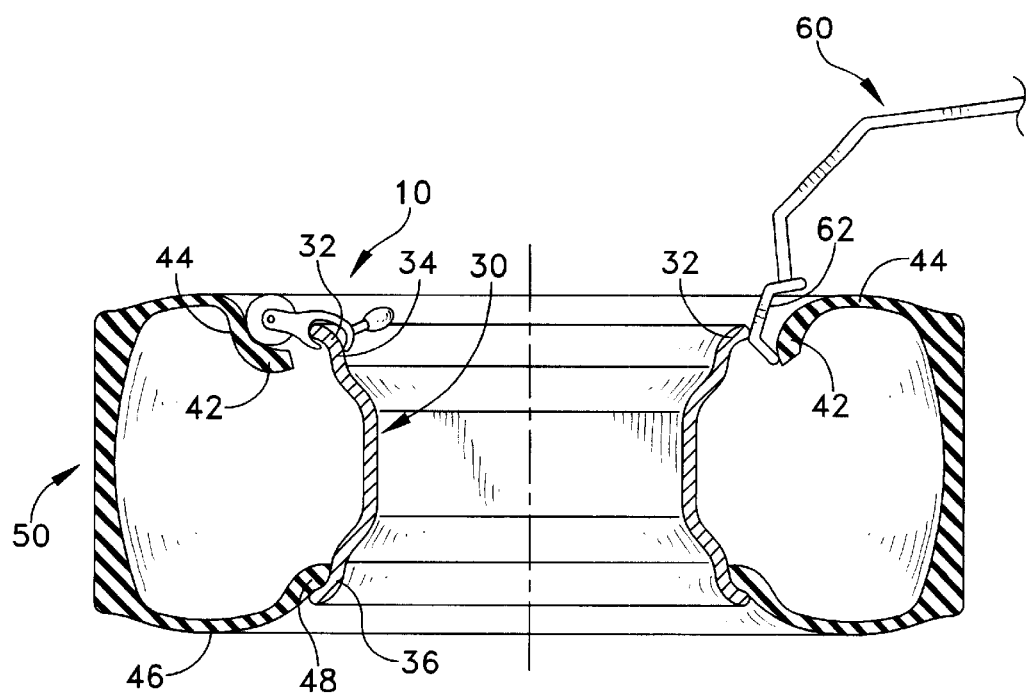
FIG. 2a is a cross-sectional view through a section of the tire and wheel, showing the relative positions of the tire bead, rim flange and the tire removal tool, as shown in FIG. 2, as used in conjunction with the pry bar.
Figure 3:
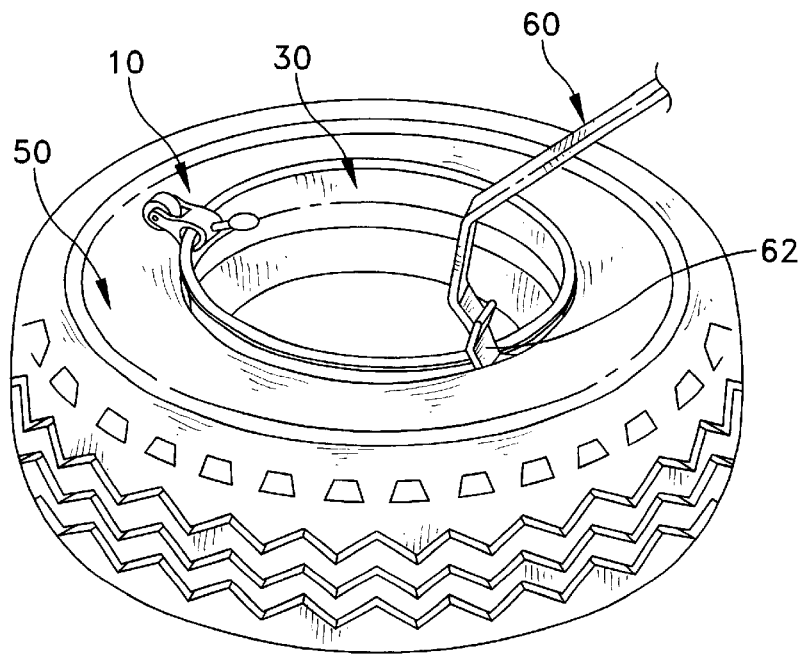
FIG. 3 is a perspective view of the tire removal tool, shown depressing a sidewall of tire axially inward on a wheel rim, while a pry bar is used to pry a portion of the tire bead, opposite the tire removal tool, over the rim flange of the wheel.
Figure 3A:
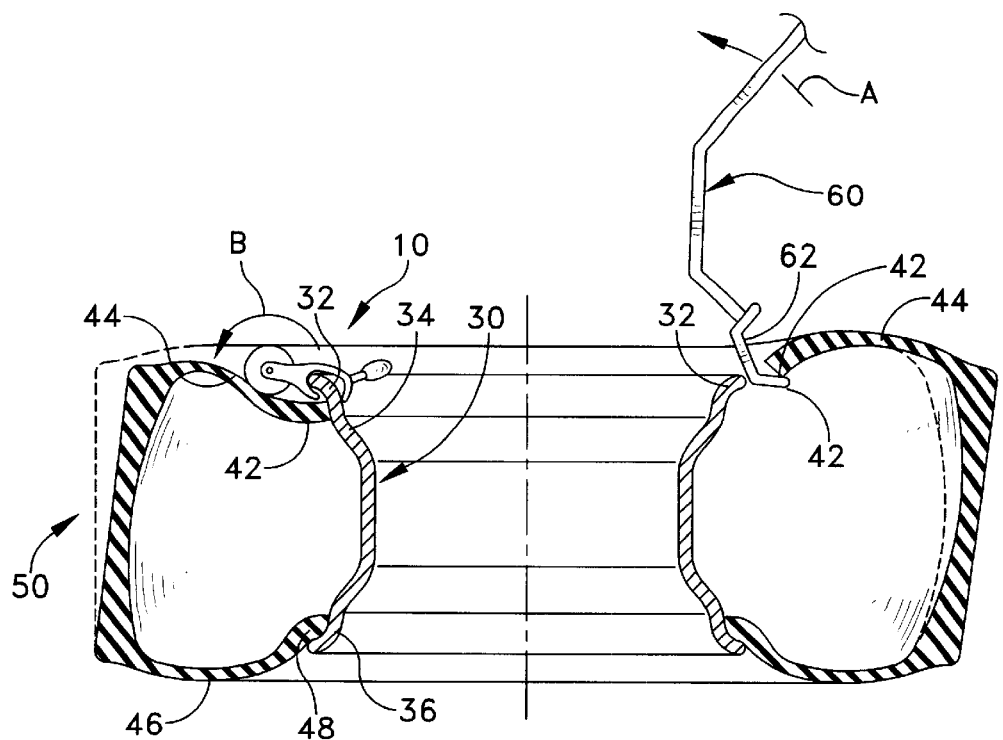
FIG. 3a is a cross-sectional view through a section of the tire and wheel, showing the relative positions of the tire bead, rim flange and the tire removal tool, as shown in FIG. 3.

The successive steps for use of the tire removal tool according to the invention are shown in FIGS. 2, 2a, 3, 3a. The tire removal tool 10 is mounted on the upper rim flange 32 of a wheel 30, having a tire 40 mounted thereon, as shown in FIG. 2. Prior to mounting tool 10, the tire 40 is deflated if possible and the seal is broken between the upper tire bead 42 and the rim flange 32, such that the bead 42 can be pushed axially inwardly, back from the rim flange 32. The removal tool 10 is mounted on the rim flange 32 so that a portion of the rim flange projects through the opening 20 of the tool body 12 and into the tool body cavity. As discussed above, the tool body rocks on a fulcrum at the lips opening into the tool body cavity and due to resilient resistance of the tire, exerts an upward pressure against the tool and causes the rim flange of the wheel to bear against one side of the tool body cavity. The position of the roller or other contact structure on the tool body is thereby fixed at a position that holds the tire sidewall axially inwardly of (or below) the position it would occupy if the bead was seated (and possibly if the tire was inflated).

To mount the tool 10 on the rim flange 32, the roller 16 is positioned over tire sidewall 44 with the opening 20 of the tool cavity 18 aligned with the upper rim flange 32. The user manually presses the roller 16 against the tire sidewall, causing the tire bead 42 to separate from the rim flange of the wheel 30. The tool is urged onto the rim flange such that the outer edge of the rim flange 32 passes through the opening 20 of the tool body 12 and is received in cavity 18. Pushing tool handle 14 down (i.e., axially inward), or allowing the resilient sidewall to push the roller on the opposite side upward, pivots the tool body until the underside of rim flange 42 rests against the outer side of cavity 18. The resiliency of the tire sidewall exerts an upward (i.e, axially outward) force on roller 16 sufficient to hold tool 10 in a stable position on the wheel rim flange 32, until manually removed by the user. In this position the bead is displaced from its seat and tension on the bead due to prying is relieved. Lifting the handle from the rest position exerts further pressure on the sidewall and further relieves the tension; however in the rest position the bead is displaced from its seat, and thus tension is relieved without requiring manual pressure or attention by the user.

With tire removal tool 10 secured on rim flange 32 as described, and the tire bead 42 separated from its seat on the rim flange 32 to an axial position at which the wheel rim has a reduced diameter 34, the flat tool end 62 of a pry bar 60 can be inserted between the tire bead 32 and wheel rim flange 42, on the side diametrically opposite from the tire removal tool, as shown in FIGS. 2 and 2a. Referring to FIGS. 3 and 3a, the user rotates the pry bar 60 in a direction indicated by arrow A, using the rim flange 32 of the wheel as a fulcrum. The tool end 62 of the pry bar pushes the tire bead 42 radially outward from the rim flange 32, causing the tire to shift laterally and eccentrically on the wheel rim. The limit of this shifting is a position at which the tire bead 32 adjacent to tool 10, abuts the wheel rim at a position of reduced rim diameter 34. This lateral or eccentric shifting of the tire is facilitated by roller 32, which rotates in a direction indicated by arrow B, permitting the tire to move eccentrically without substantial resistance.

Further rotation of the pry bar lifts a portion of the tire bead 42 over the rim flange 32. The pry bar can then be removed and reinserted between the tire bead 42 and rim flange 32 at successive positions about the periphery of the wheel 30, preferably after inserting some form of holding tool such as a second pry bar or a screwdriver (not shown) at the portion initially passed over the rim. The user enlarges the circumferential portion of the bead that has been moved to the outside of the rim. When the portion outside of the rim approaches half the circumference of the bead, the portion outside the rim can be shifted radially inwardly to relieve tension, and tool 10 is no longer needed. In this manner the tire bead is completely passed over the rim flange 32 of the wheel 30. Alternatively, after an initial length of tire bead 42 has been pried beyond the rim flange 32, a powered machine may be utilized for sliding a tool circumferentially around the periphery of the wheel rim flange 32 between the rim flange and the bead, whereby the bead 42 is pulled over the rim flange 32 in a continuous motion.

The lower tire bead 48 is lifted over the upper rim flange 32 in a manner similar to the way in which the upper tire bead 42 was lifted, but the resilience or stiffness of the sidewalls presents less of a problem. However, tool 10 can be used to hold the lower sidewall in an elevated position by passing the roller of tool 10 under the lower sidewall. Tool 10 is then urged by the weight of the tire to rotate counterclockwise to a position at which the roller is at its downward extreme and the rim flange rests against the opposite side of cavity 18. Manual pressure downwardly on the tool handle further lifts the sidewall and relieves tension by bringing the bead closer to the level of the bead on the opposite side of the wheel.

The user mounts the tire removal tool 10 on the upper rim flange 32 of wheel 30. The tool end 62 of a pry bar 60 is inserted between the upper rim flange and the lower tire bead 48. The user then lifts up pry bar 60 causing the pry bar to pivot about the upper rim flange 32. As the pry bar is rotated, the tool end 62 of the pry bar first pushes tire bead 42 radially outward from the rim flange 32, again causing tire 50 to shift laterally on wheel rim 30, and in this case upwardly as well. Roller 16 supports lower tire bead 48 without causing it to abut the bead seating position against upper rim flange 32, and keeping the lower tire sidewall 46 axially spaced from the upper rim flange 32. Tire 50 can shift laterally on rim 30 in the direction of prying, without resistance due to the roller of the tool, thereby allowing the lower tire bead to be lifted over the upper rim flange 32 in the same manner as discussed above with reference to the upper bead. The prying process is repeated at several positions about the wheel periphery, or a continuous powered tool is passed between the rim and the lower tire bead 48, until the whole tire has been passed over the upper rim flange 32.

Figure 4:
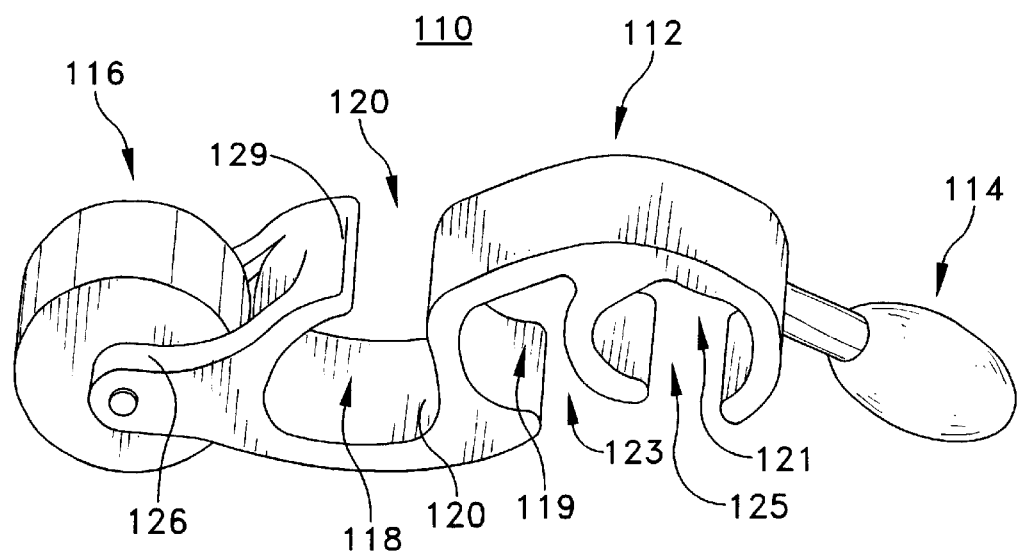
FIG. 4 is a perspective view of an alternative embodiment of the tool for removing and installing a tire from a rim in accordance with the invention.

FIG. 4. shows an alternative embodiment of the invention. In this embodiment, the tool body is provided with a plurality of lateral cavities at different distances from the handle and the roller, respectively. In the embodiment shown, two cavities are provided on one side of the tool and one cavity is on the other side. Two cavities rather than three are possible, as are other arrangements of cavities on one side or the other. The disclosed arrangement with three cavities is compact and is preferred.

By providing multiple cavities, the user has the option to choose which cavity to use for a given operation or for tires and wheel rims of different sizes or different structures (e.g., pneumatic versus resiliently filled, etc.). The tire removal tool 110 includes an elongated tool body 112 having three lateral cavities 118, 119, 121 for engaging a wheel rim flange, a handle portion 114 secured to the tool body 112, and a rotatable roller 116 secured to tool body. The respective openings 120 in cavity 118, 123 in 119 and 125 in 121, each provide a selectable lip or fulcrum opening at a different spacing between the handle and the roller. The appropriate tool cavity is selected for a particular wheel rim and tire, such that roller 116 is appropriately placed on the corresponding tire sidewall. For example, if the tool will be used for installing or removing a tire having a high profile, the user may want to engage the cavity nearest the handle portion 114 of the tool; i.e, cavity 121, with the wheel rim flange. By engaging the cavity nearest the handle portion 114 with the rim flange, the roller would be positioned at its furthest radial position from the rotational axis of the wheel. In the alternative, if a low profile tire is being installed or removed, engaging the cavity nearest the roller 116; i.e., cavity 118, with the wheel rim flange rim would locate roller 116 at its closest radial position to the rotational axis of the wheel.

The choice of the cavity also affect the mechanical levering advantage provided by the tool, and the relative displacement of the roller between its extremes of position. The size, number, location, and orientation of lateral cavities and their corresponding cavity openings, may be varied to suit particular needs, and for a given combination of available cavities, the user is free to choose the cavity most appropriate to the tire size and resilience, and for use to handle the upper or lower tire bead.

The tool 10 as described can assist in mounting a tire on a wheel rim, as well as in demounting a tire. For mounting, for example, a tire 50 is placed atop a wheel rim 30, laid on its side as shown. The tire is manipulated eccentrically relative to the wheel rim to place a portion of the lower tire bead 48 below the upper rim flange 32. Passing the remainder of the bead over the rim requires a prying operation similar to that discussed above for removing a tire. The tool 10 is disposed on the upper rim flange 32 to position the adjacent portion of lower tire bead 48 below the upper rim flange 32. The tool end 62 of a pry bar 60 is inserted between the upper rim flange 32 and the lower tire bead 48, at the opposite side of the upper rim flange 32 from the tool 10. The prying operation and its associated eccentric displacement of the bead relative to the tire is then repeated in reverse, with the roller supporting the lower bead or depressing the upper bead, in each case permitting eccentric lateral displacement of the tire.

Using the upper rim flange 32 as a fulcrum, the user rotates the pry bar radially outward from the wheel center, causing the tire to shift laterally on the wheel rim 30 and to pass the bead over the rim generally in the area diametrically opposite from the position at which the lower tire bead 42 is maintained at a position of reduced rim diameter 34. The tire shifts freely on roller 16 without friction or damage to the tire sidewall. The pry bar is manipulated around the bead, preferably using an additional tool (not shown) to hold the bead already passed over the rim, until the tire bead has completely passed over the upper rim flange 32.

The tool can be repositioned as necessary, and upper tire bead 42 is installed in the same manner as the lower tire bead 48 was installed. Namely, the user pushes a portion of upper tire sidewall 44 to a position below the upper rim flange 32 and maintains it by placing tool 10 to retain the depressed portion of the upper tire sidewall 44 and corresponding upper tire bead 42 below the upper rim flange. The steps outlined above for installation of the lower tire bead 48 are repeated for completing installation of the upper tire bead 42.

A tool for removing and installing a tire on a wheel rim in accordance with the invention is relatively small, lightweight and inexpensive to produce. The tool allows a single person to remove and install a tire, including a low profile tire, a tractor tire, a run-flat tire, or the like, on a wheel rim in a simple and efficient manner and reduces dependence on powered tire handling machines. The tool may be used in combination with one or more pry bars or similar device for manual tire removal and installation, or in combination with a powered machine, if available.

The invention has been described in terms of certain exemplary embodiments that should not be regarded as limiting. The invention is defined by the appended claims, which include other variants and embodiments of the invention, without departing from the scope and range of equivalents of the invention that is disclosed above.

What is claimed is:

1. A tool for removing and installing a tire on a wheel, the wheel having axially spaced rim flanges at a radially outward edge, the tire having axially spaced sidewalls and axially spaced beads at a radial inward edge of the sidewalls, the beads having a circumference smaller than the circumference of the rim flanges, the tool comprising:

a tool body having at least one lateral cavity for engaging the rim flange, the cavity having a lateral opening for receiving a portion of the rim flange;

a handle portion secured to the tool body; and a rotatable roller secured to the tool body, wherein the cavity has a longitudinal dimension that is greater than a longitudinal dimension of the cavity opening, whereby the tool body is movable between two positions at which the rim flange abuts internal walls of the cavity.

2. The tool of claim 1 wherein said longitudinal cavity dimension is at least two times the longitudinal dimension of the cavity opening.

3. The tool of claim 1 wherein said lateral cavity has an arcuate profile.

4. The tool of claim 1 wherein said handle portion and said rotatable roller are in serial relationship.

5. A tool for removing and installing a tire on a wheel, the wheel having axially spaced rim flanges at a radially outward edge, the tire having axial spaced beads at a radial inward edge of the tire sidewalls, the beads having a circumference smaller than the circumference of the rim flanges, the tool comprising;

an elongated tool body having at least two lateral openings for engaging said rim flange;

a handle portion secured to said tool body; and a rotatable roller secured to tool body;

wherein disposing said tool on said rim flange causes said rotatable roller to engage the sidewall of the tire, whereby said tire bead is axially displaced from abutment with said rim flange.

6. The tool of claim 5 wherein at least two of the lateral openings are opposite facing.

7. The tool of claim 5 wherein said handle portion, said rim flange engaging portion and said rotatable roller are in serial relationship.

8. The tool of claim 5 wherein said rim engaging portion includes and arcuate rim engaging surface and the force of the tire on said rotatable roller causes said rim engaging surface to be temporarily fixed in position on said rim flange.

* * * * *